May 6, 1924.
W. K. YOUNG
PISTON
Filed Nov. 4, 1920
1,492,590
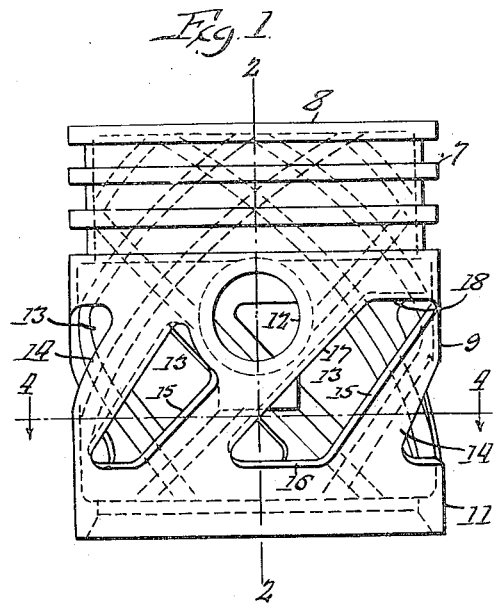
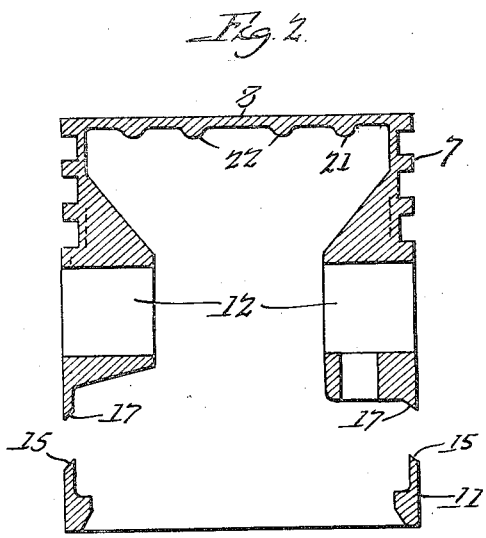
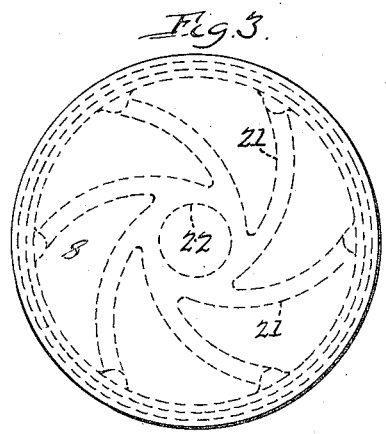
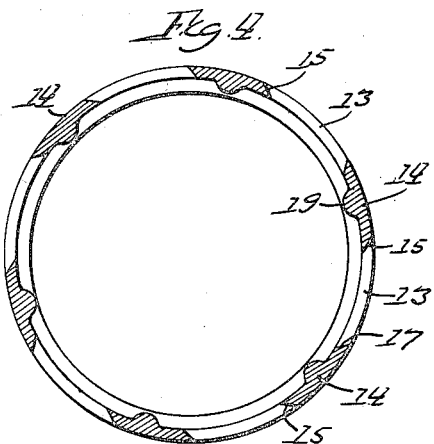
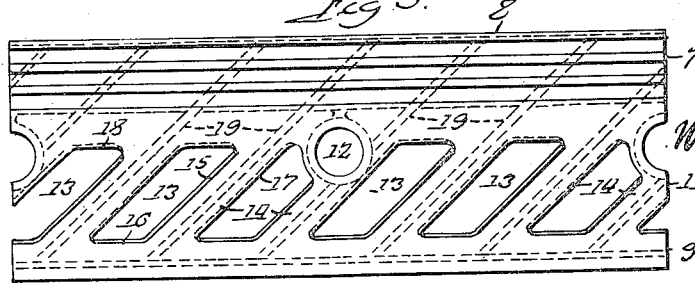
Inventor:
William K. Young
By Ira J. Wilson
Atty.

Patented May 6, 1924.

1,492,590

UNITED STATES PATENT OFFICE.

WILLIAM K. YOUNG, OF ROCKFORD, ILLINOIS.

PISTON.

Application filed November 4, 1920. Serial No. 421,650.

*To all whom it may concern:*

Be it known that I, WILLIAM K. YOUNG, a citizen of the United States, residing at Rockford, in the county of Winnebago and State of Illinois, have invented certain new and useful Improvements in Pistons, of which the following is a specification.

This invention relates to pistons for internal combustion engines.

One of the primary objects of this invention is to provide a superior and more efficient piston than any heretofore in use. To this end, I have incorporated in a piston certain principles which promote lightness, proper lubrication and greater life to the piston and cylinder. Lightness is especially desired, as it promotes kinetic efficiency and reduced the cost of production. If the piston is too loose it soon developes what is known as "piston slap", and also pumps oil. If it fits too tightly, it often scores and scratches the cylinder walls, requiring reboring. By providing proper lubrication for the piston, especially at the point of heaviest thrust and by securing a close fit without seizing, the wear is reduced to a minimum and the life of the piston and cylinder greatly increased.

The foregoing desiderata I have obtained, and the objections overcome by the provision of a so-called light-wall piston, characterized by a skirt portion cutaway or so shaped as to form spirally disposed ribs or veins and oil passages. This construction does not weaken the piston, but adds resiliency and strength. It also permits fitting the piston closer to the cylinder wall, because the perforated skirt will not become heated as will a solid piston, hence will not be subject to expansion and may be fit very closely. Furthermore, this construction insures the delivery of a thin film of oil over the entire cylinder wall and especially at the point of heaviest thrust, and at the same time prevents leakage past the piston.

Another object is to provide a piston having a skirt portion so shaped as to provide pockets extending substantially throughout the length of the skirt portion and circumscribing the same, which carry oil and lubricate the cylinder wall on the upward stroke, and on the downward stroke wipe off the surplus oil and discharge it into the interior of the piston, where it falls to the crank case.

Still another object is to reinforce a thin-wall piston in a novel manner to obtain the desired rigidity and strength with the minimum weight.

Other objects and attendant advantages will be appreciated by those skilled in this art as the invention becomes better understood by reference to the following description when considered in connection with the accompanying drawings, in which—

Figure 1 is a side view of a piston embodying my invention;

Fig. 2, a longitudinal sectional view through the piston taken on the line 2—2 of Fig. 1;

Fig. 3, a top view of the piston;

Fig. 4, a cross-sectional view taken on the line 4—4 of Fig. 1; and

Fig. 5, a development of the piston wall on a reduced scale.

The principles of my invention may be applied to any piston for any internal combustion engine, although greater efficiency is obtained when embodied in a light-wall piston. In the drawings, I have shown a light-wall piston and certain features of my invention, especially as regards reinforcing, have particular reference to this type of piston construction. Other features of my invention, however, are applicable equally as well to pistons having substantially standard wall dimensions.

The piston shown in the drawings, comprises a ring body 7, head 8 and a skirt which I shall refer to as comprising upper and lower portions 9 and 11 respectively. Suitable provision is made for carrying the wrist pin, as for example bearings 12 formed integral with the piston.

It will be observed that the skirt throughout substantially its entire length, with the exception of the lower portion 11, is perforated or cut away by a series of spirally disposed openings 13. The piston wall between these openings constitute what I term ribs or veins, likewise spirally disposed. The upper longitudinal edges 15 of each vein and also the bottom edge 16 between the veins, are inclined to provide obtuse angles with the peripheral wall of the piston, and the lower longitudinal edges 17 and top edges 18 are inclined to provide acute angles. By reason of this construction, the edges 15 and 16 constitute pockets which on the upward stroke of the piston, hold oil and spread it around the cylinder wall, and the sharper edges 17 and 18 serve on the downward stroke, to wipe off the surplus oil, leaving only a thin film of oil on the cylinder wall. It follows, therefore, that as the piston reciprocates, it will function to distribute oil entirely around the cylinder wall during the up stroke and remove the surplus on the down stroke, thus insuring proper lubrications at all points and especially at the point of heaviest thrust opposite the skirt, which reduces wear to the minimum and adds to the life of the piston and cylinder. By perforating the skirt in the manner described, it is also possible to fit the piston closer to the cylinder walls than is possible with a solid skirt. There is greater resiliency in such a perforated skirt, and the latter by reason of the relatively large openings and of the passage of oil and air therethrough, is kept cool and is not liable to expand and seize and wear the cylinder. In a solid wall piston, special allowance must be made for such expansion, consequently the piston can not be fit as closely as one of the present construction.

My invention also contemplates a thin-wall construction reinforced by spiral ribs. As shown in the drawings, each vein 14 is reinforced on its inner side by a rib 19, which extends to the head 8 and is continued along the underside thereof, these ribs 21 merging at the central portion of the head into a ring formation 22. The ribs 19 and 21 by being spirally arranged, distribute the weight and strength more evenly and proportionally about the piston wall and head than is possible with straight ribs of similar weight, and thus make possible the construction of a relatively thin-wall, light weight piston of maximum strength.

Internal combustion engine pistons are subject to hard usage and heavy strains and stresses, as well as to extremely high temperatures when running and sometimes to extremely low temperatures when standing, with the result that the expansion and contraction of the metal of the pistons is relatively great. With pistons as heretofore reinforced by ribs and highly heated by reason of the running of the engine, the thinner portions of the walls between the ribs tend to be pressed inwardly by the explosive force while along the lines reinforced by the ribs the walls of the piston will retain their original positions, wherefore the exterior of the piston will present corners or projections at or along the ribs, which corners or projections will score grooves in the surrounding walls of the cylinder. In the present construction the spirally disposed ribs overlap each other circumferentially of the piston, and even though the thinner walls of the piston between the ribs may be pressed inwardly, the reinforced portions of the walls will retain their original shape and the piston will remain circular in form instead of becoming polygonal and of course will not score or groove the cylinder. A further advantage is secured by the present invention, in that if the cylinder is not precisely round, the piston when heated and expanded is capable of slight deformation from a true circle to conform to the cylinder, this being true because of the fact that the spiral ribs are capable of slight distortion circumferentially of the cylinder. Again, the present spiral arrangement of ribs permits of the piston being snugly fitted to the cylinder, when cold, so as to preclude oil leakage, and when the piston becomes expanded it is capable, by reason of the spiral arrangement of reinforcing ribs, of a limited distortion and flexibility, which compensates for the expansion and obviates sticking or freezing to the cylinder walls.

The spiral arrangement of the ribs 21 on the under side of the piston head 8 is also important, as distinguished from straight radial reinforcing ribs, in that straight radial ribs elongate under the action of heat and hence their outer ends form projections extending beyond the walls of the piston and score the cylinder, whereas the bowed or spiral configuration of the present ribs prevents elongation because the expansion under heat will cause the ribs to bulge or bow laterally rather than elongate, and therefore whatever expansion of the head occurs will be uniform and no projections will result and hence scoring of the cylinder is prevented.

It will be noted that the reinforcing ribs 19 are disposed between the successive openings 13 and extend along the ribs or veins between the openings in order that each rib may be continuous from end to end of the piston and thus compensate in strength for the material omitted by reason of the openings.

It should be understood that my invention contemplates broadly the perforating or shaping of the skirt in any suitable manner for any of the purposes expressed herein or inherent in the construction disclosed.

It is believed that the foregoing conveys a clear understanding of the invention, and while I have illustrated but a single working embodiment, it should be understood that various changes might be made in the construction without departing from the spirit and scope of the invention as expressed in the appended claims, in which

I claim:

1. A piston whose ring-body and lower skirt portion are joined by spirally disposed veins, the upper longitudinal edges of which are shaped to provide oil pockets and the lower longitudinal edges to draw the oil into the interior of the piston.

2. A thin-wall piston having a spiral vein skirt portion and spiral ribs reinforcing said veins.

3. A thin-wall piston having a spiral vein skirt portion and spiral ribs reinforcing said veins and reaching to and extending spirally across the underside of the piston head.

4. A piston whose skirt portion has spirally disposed oil passages, the lower edges and upper wall edges of which form obtuse angles and the top edges and lower longitudinal edges of which form acute angles with respect to the periphery of the piston.

5. A thin-wall piston of uniform outer diameter substantially throughout its length, the skirt portion of said wall having a plurality of circumferentially spaced through openings which permit oil to splash onto the cylinder wall from within the piston, the thin-wall portions between said openings being longitudinally reinforced on their inner sides.

6. A thin-wall piston, the head of which is reinforced by spiral ribs.

7. A piston having a thin-wall skirt portion perforated by circumferentially overlapping openings, and rows of reinforcing for the thin-wall portions between said openings.

8. A thin-wall piston, the circular wall of which is reinforced on its inside by spirally disposed ribs reaching throughout the skirt portion to the head, and continuing spirally inwardly along the underside of the head.

9. A piston, the skirt portion of which is spirally perforated, the upper edges of said perforations being shaped to draw the oil inwardly and the lower edges to thrust the oil outwardly.

10. A piston, the skirt portion of which has a plurality of circumferentially spaced through openings, the wall along the upper edge of each opening being shaped to draw oil inwardly from the cylinder wall, and shaped along the lower edge to thrust oil outwardly.

11. A thin-wall piston, the skirt portion of which has through perforations of relatively large area and is reinforced on its inside by ribs intermediate the perforations.

12. A piston, the skirt portion of which has circumferentially spaced through perforations of relatively large area, allowing the oil to splash onto the cylinder wall from the inside of the piston, said perforations being so shaped and arranged that the upper and lower edges of each perforation circumferentially overlaps those of the next adjoining perforation, whereby on the down stroke the upper edges will draw the oil inwardly from the cylinder wall throughout its circumference and on the up stroke the lower edges will spread the oil over said wall.

13. A piston having a thin-wall skirt portion having circumferentially spaced through openings which permit oil to splash onto the cylinder walls from within the piston, and spirally disposed rows of reinforcing for the thin-wall portions between said openings.

14. A piston having a thin-wall cylindrical body provided on its inner side with reinforcing ribs inclined longitudinally and overlapping circumferentially whereby to prevent flattening of the thin-wall body between the ribs due to the side thrust imposed on the piston.

15. A hollow piston, comprising a head and side wall, the inner surfaces of the head and side wall having a series of reinforcing ribs formed continuously spiral relative to the head and side wall.

16. A hollow piston, comprising a head and side wall formed on the inner surfaces thereof with reinforcing ribs arranged continuously spiral with respect to the head and side wall, the ribs on the side wall overlapping in vertical planes.

17. A hollow piston, comprising a head and side wall, the latter having inwardly extended hollow wrist pin bosses, integral ribs formed on the head and side wall, the ribs on the head portion being spirally arranged and merging into spirally arranged rib portions on the side wall, the latter rib portion intersecting the bosses.

18. A hollow piston including a head and side wall, and a series of reinforcing ribs, each continuous from the central portion of the head to the lower portion of the side wall, each rib being spiral with respect to the radial line of the head and also spiral with respect to the vertical plane of the side wall.

WILLIAM K. YOUNG.